United States Patent
Jang et al.

(10) Patent No.: US 7,327,639 B2
(45) Date of Patent: Feb. 5, 2008

(54) HYBRID WRITING AND READING HEAD TO RECORD DATA WITH HIGH DENSITY

(75) Inventors: Dong-seob Jang, Seoul (KR); Kun-ho Chu, Gyeonggi-do (KR); Dae-sik Kim, Gyeonggi-do (KR); Gyu-chan Jun, Seoul (KR); Young-min Cheong, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 579 days.

(21) Appl. No.: 10/401,583

(22) Filed: Mar. 31, 2003

(65) Prior Publication Data

US 2004/0081030 A1    Apr. 29, 2004

(30) Foreign Application Priority Data

Mar. 30, 2002    (KR) ............................... 2002-17603

(51) Int. Cl.
*G11B 11/105*    (2006.01)
(52) U.S. Cl. ............................... 369/13.17; 369/112.27
(58) Field of Classification Search ..................... None
See application file for complete search history.

(56) References Cited

U.S. PATENT DOCUMENTS

| | | | | |
|---|---|---|---|---|
| 5,986,978 A | * | 11/1999 | Rottmayer et al. | 369/13.17 |
| 6,351,436 B1 | * | 2/2002 | Mallary | 369/13.17 |
| 6,636,460 B2 | * | 10/2003 | Akiyama et al. | 369/13.14 |
| 6,687,195 B2 | * | 2/2004 | Miyanishi et al. | 369/13.13 |
| 6,687,196 B1 | * | 2/2004 | Ueyanagi | 369/13.33 |
| 6,836,957 B2 | * | 1/2005 | Kobayashi | 29/603.16 |

(Continued)

FOREIGN PATENT DOCUMENTS

JP    04-012508    1/1992

(Continued)

*Primary Examiner*—Andrea Wellington
*Assistant Examiner*—Michael V Battaglia
(74) *Attorney, Agent, or Firm*—Stein, McEwen & Bui, LLP (57) ABSTRACT

A hybrid head to record and reproduce high density data. The hybrid head to record and reproduce data includes an element to record and reproduce data which is formed at the back side of a slider. The element to record and reproduce data includes an energy source to supply energy required to heat a predetermined region of a recording medium to be data-recorded, a magnetic field applier to apply a magnetic field to the predetermined region of the recording medium heated by the energy supplied from the energy source, a data reproducer to reproduce data from the recording medium, a channel to allow the magnetic field supplier to transmit the energy supplied from the energy source to the predetermined region of the recording medium, a heat shield element to prevent heat from being transmitted from the channel to other elements around the channel, a write pole covering the heat shield element, and a magnetic field generator to generate a magnetic field to the write pole. With this design, it is possible to prevent or minimize heat generated by a channel to transmit energy from being transmitted to other elements installed around the channel. In addition, it is possible to prevent the characteristics of the other elements around the channel from being changed due to the heat generated by the channel.

37 Claims, 4 Drawing Sheets

U.S. PATENT DOCUMENTS

6,876,604 B2 * 4/2005 Ueyanagi .................. 369/13.23
2002/0003752 A1 * 1/2002 Fuji et al. ................. 369/13.13

FOREIGN PATENT DOCUMENTS

| JP | 07-085411 | 3/1995 |
| JP | 2001-325756 | 11/2001 |
| JP | 2002-050001 | 2/2002 |
| JP | 2002-50001 | 2/2002 |
| WO | WO 01/65547 | 9/2001 |
| WO | WO 01/67443 | 9/2001 |

* cited by examiner

A hard disk drive (HDD) includes a recording medium, where data is recorded, a head to record data on the recording medium, a driver to drive the recording medium and the head, an interface to connect the HDD to a computer, and an electronic circuit to drive and control the other elements.

The head can be called a magneto resistive head or a grand magneto resistive head (GMR), depending on the magnetic sensor used to read the data written on the recording medium. A magneto resistive head, in which a magneto resistive sensor is used, had been widely used until the grand magneto resistive sensor was developed, which is more sensitive than the magneto resistive head. Recently, the grand magneto resistive head using a grand magneto resistive sensor has gradually replaced the magneto resistive head. More recently, a tunnel magneto resistive (TMR) sensor using the TMR sensor has been developed, which is highly anticipated and being scrupulously observed.

A hybrid head to write and read data includes a magneto sensor, which is a data reproducer, and a magneto-optic writer, which is a data recorder. The magneto-optic writer records data on a recording medium by heating a certain portion of the recording medium so that the temperature can exceed Curie's temperature, and thus temporarily lowering the magnetic force of this portion. Accordingly, the magneto-optic writer can reduce the magnitude of the magnetic force required to record data less than that of the magnetic force required for a conventional writer. During this process of recording data using the hybrid head, since data is recorded on the portion of the recording medium which exceeds Curie's temperature, the density of data recorded on the recording medium depends not on the size of a pole that generates a magnetic field between gaps but the width of the heated portion of the recording medium. Therefore, when heating the recording medium with a laser diode, the density of data recorded on the recording medium is determined by the width of a laser beam generated from the laser diode.

Figure 1:
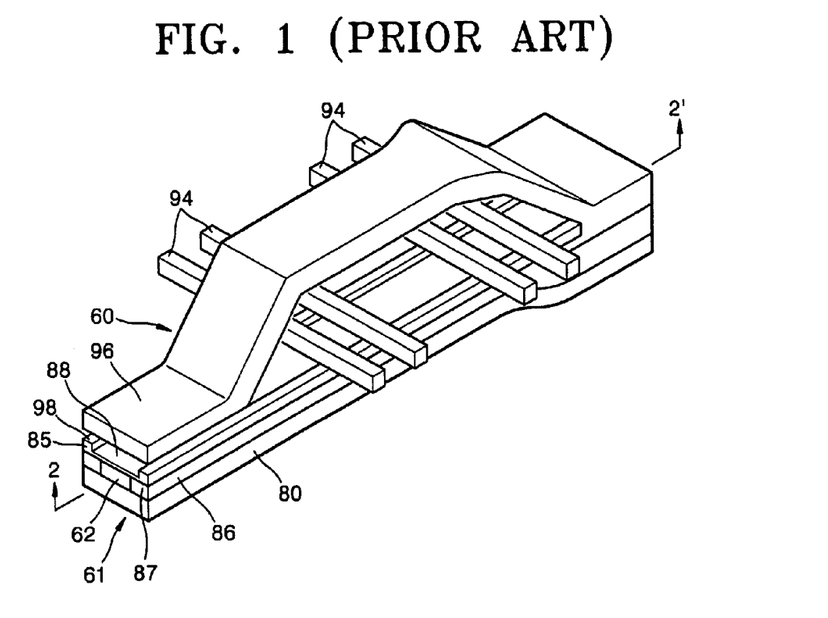
FIG. 1 is a perspective view of a conventional hybrid head to record and reproduce data.

Until now, various types of hybrid heads having such characteristics have been suggested, and some of them have been widely used. FIG. 1 is a perspective view of an example of a conventional hybrid head.

In FIG. 1, reference numerals 60 and 61 represent a data recorder and a data reproducer, respectively. The data reproducer 61 includes a first shield layer 80, a second shield layer 85, an insulation layer 86 formed between the first and second shield layers 80 and 85 to have one side facing a recording medium, and a grand magneto resistive element 62 surrounded by the insulation layer 86 and the first and second shield layers 80 and 85. The first shield layer 80 comprises a magnetic material that is conductive. The second shield layer 85, which is also part of the data recorder 60, is formed of the same material as the first shield layer 80 and includes an optic channel 88 formed at its one side. The other side of the second shield layer 85 contacts the grand magneto resistive element 62. The optic channel 88 serves as a waveguide to transmit laser beams used to heat a certain portion of the recording medium formed along the second shield layer 85 to a critical temperature close to the Curie's temperature.

Figure 2:
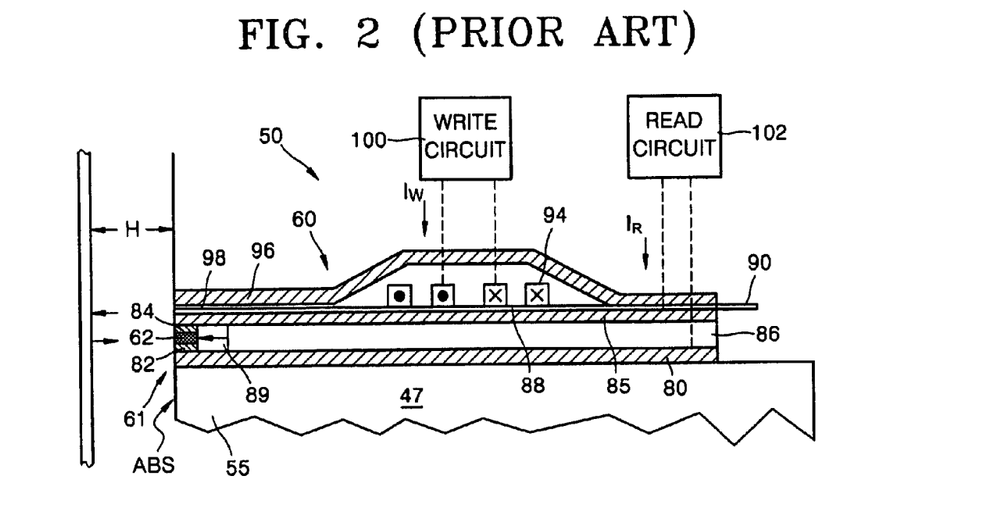
FIG. 2 is a cross-sectional view of a conventional hybrid to record and reproduce data, taken along the direction represented by 2-2' of FIG. 1.

Referring to FIG. 2, the grand magnetic resistive element 62 is formed between a first contact element 82 formed on an end of the first shield layer 80 facing a recording medium and a second contact element 84 formed on the second shield layer 85 to face the first contact element 82. A nonconductive magnetic bias element 89 is formed behind the grand magneto resistive element 62 comprising the first and second shield layers 80 and 85 and the insulation layer 86 so that it can contact the first and second contact elements 82 and 84. The magnetic bias element 89 generates a magnetic biasing field acting toward the grand magneto resistive element 62. In FIG. 2, arrows indicate the magnetic biasing field. The first and second contact elements 82 and 84 are formed of a nonmagnetic material which is conductive.

Referring to FIGS. 1 and 2, the insulation layer 86 is formed on the first shield layer 80 to surround the first and second contact elements 82 and 84 and the grand magneto resistive element 62 and to define a nonmagnetic transducing read gap 87.

Referring to FIG. 1, the data recorder 60 includes first and second pole layers 85 and 96 and coils 94. The first pole layer 85 is formed of the same material as the second shield layer 85, and the second pole layer 96 is formed of the same material as the first shield layer 80 or a material having almost the same conductivity as the first shield layer 80. The ends of the first and second pole layers 85 and 96 are formed apart from each other by as much as a write gap 98. The write gap 98 may be filled with the same material as the insulation layer 86 or a material having almost the same conductivity as the insulation layer 86. The coils 94 are formed between the first and second pole layers 85 and 96 lying across the insulation layer 86.

Figure 4:
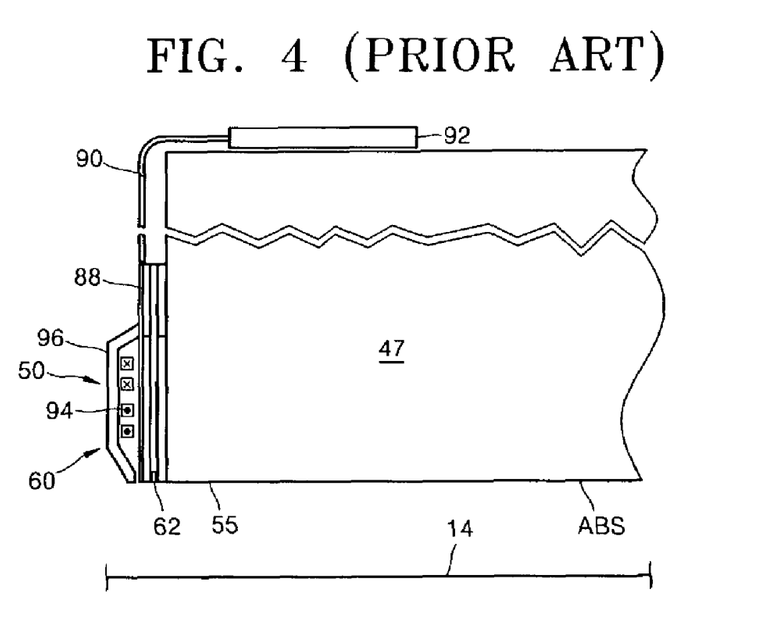
FIG. 4 is a cross-sectional view of a conventional hybrid head to record and reproduce data, along with a laser diode installed on a slider.

Referring to FIG. 2, a write circuit 100 used to record data is connected to the coils 94. Current Iw required to record data is applied from the write circuit 100 to the coils 94, and accordingly, a magnetic field is generated around the coils 94. The magnetic field is applied to the write gap 98 along the first and second pole layers 85 and 96, and then desired data is recorded by recording "1" or "0" on a certain region of the recording medium facing the write gap 98 using the magnetic field. Before recording data, the certain region of the recording medium is heated above Curie's temperature. In order to heat the certain region, an optic fiber 90 is formed to extend to an air bearing surface (ABS) of a slider 47 via the optic channel 88 between the first and second pole layers 85 and 96. Energy is provided from a heat source 92 of FIG. 4 to the certain region of the recording medium via the optic fiber 90, and the certain region of the recording medium is heated above Curie's temperature. The heat source 92 is formed on the slider 47 and is connected to the optic fiber 90 (see FIG. 4). A read circuit 102 to reproduce data recorded on the recording medium is connected to the first and second shield layers 80 and 85. The read circuit 102 applies current Ir to the first and second shield layers 80 and 85 when reproducing data. During the reproduction of data recorded on the recording medium, the resistance of the grand magneto resistive element 62 varies depending on the magnetization state of the data, and accordingly, voltage applied to either end of the grand magneto resistive element 62 varies. Due to the voltage variations, electric signals corresponding to the data recorded on the recording medium are generated, and the data can be reproduced in a desired shape using the electric signals. In FIG. 2, "H" represents a gap between the recording medium and a head, in other words, a flying height.

Figure 3:
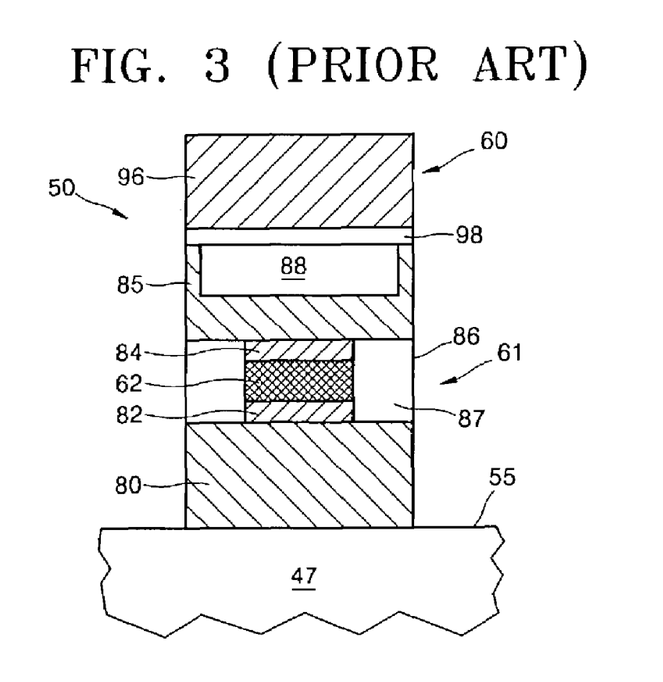
FIG. 3 is a diagram of a conventional hybrid to record and reproduce data, seen from below.

FIG. 3 is a diagram illustrating the data recorder 60 and the data reproducer 61 seen from the recording medium. The structures of the data recorder 60 and the data reproducer 61 become clearer with reference to FIG. 3. In other words, the first shield layer 80 through the second pole layer 96 are sequentially aligned with the end 55 of the slider 47.

In the case of the conventional head to record and reproduce data, data is recorded by heating a certain region of the recording medium above Curie's temperature and thus lowering the magnetic force of this region to record data. Accordingly, it is possible to lower the magnitude of the magnetic field required to record data by several hundreds of Oersteds. However, since a first pole layer is formed around an optic channel, the physical characteristics of the first pole layer may be varied because of heat generated during the recording of data. As a result, the first pole layer may not serve as a magnetic material. The variation in the physical characteristics of the first pole layer may affect a grand magneto resistive element, and thus the grand magneto resistive element may not perform its functions well.

In addition, since the structure of a magneto-optic recording head is almost the same as a recording head of a conventional hard disk driver, it may be difficult to apply photolithography to the magneto-optic recording head.

SUMMARY OF THE INVENTION

Accordingly, it is the object of the present invention to provide a hybrid head to record and reproduce data which can minimize transmission of heat, generated by a channel to transmit energy used to heat a particular region of a recording medium to other elements around the channel, and thus can prevent the characteristics of the other elements around the channel from being affected by the heat.

Additional objects and advantages of the invention will be set forth in part in the description which follows and, in part, will be obvious from the description, or may be learned by practice of the invention.

The foregoing and other objects of the present invention are achieved by providing a hybrid head to record and reproduce data having an element to record and reproduce data which is formed at the back side of a slider. The element to record and reproduce data includes an energy source to supply energy required to heat a predetermined region of a recording medium to be data-recorded, a magnetic field applier to apply a magnetic field to the predetermined region of the recording medium heated by the energy supplied from the energy source, a data reproducer to reproduce data from the recording medium, a channel to allow the magnetic field supplier to transmit the energy supplied from the energy source to the predetermined region of the recording medium, a heat shield member to prevent heat from being transmitted from the channel to other elements around the channel, a write pole covering the heat shield member, and a magnetic field generator to generate a magnetic field to the write pole.

In an aspect of the invention, the energy source is a light source or a heat source. In yet another aspect of the invention, the light source is a laser diode. In yet another aspect of the invention, the laser diode is formed in the slider at a certain depth to protrude to a certain height. In yet another aspect of the invention, the channel comprises a waveguide layer to transmit the energy supplied from the energy source and a reflection layer to reflect the energy traveling through the waveguide layer back into the waveguide layer. In still another aspect of the invention, the reflection layer is a material layer formed of multiple layers having a higher refractive index than the waveguide layer. In still another aspect of the invention, the heat shield member is a heat absorption layer or a heat shield layer. In still another aspect of the invention, the write pole is formed of a soft magnetic material.

In another aspect of the invention, the magnetic field generator comprises a coil formed to wind around the write pole and to partially contact the data reproducer, and two conductors formed to be connected to both ends of the coil, respectively. The two conductors may be formed in symmetry with respect to the coil.

In another aspect of the invention, the data reproducer comprises: a shield layer formed at the back side of the slider directly below the energy source; first and second conductors formed in symmetry with respect to the shield layer, the first and second conductors, parts of which are in the shield layer and are exposed through one side of the shield layer facing the data recording medium; and a magnetic sensor formed between the parts of the first and second conductors in the shield layer to contact the first and second conductors, the magnetic sensor being exposed through the one side of the shield layer facing the data recording medium.

In another aspect of the invention, the first and second conductors are formed in symmetry to extend from the lower end of the shield layer toward the upper end of the shield layer. In still another aspect of the invention, the magnetic sensor is a grand magneto resistive sensor, a tunnel magneto resistive sensor, or a spin value sensor.

According to the present invention, it is possible to prevent or minimize heat generated by a channel to transmit energy from being transmitted to other elements installed around the channel. Accordingly, it is possible to prevent the characteristics of the other elements around the channel from being changed due to the heat generated by the channel.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE INVENTION

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 5:
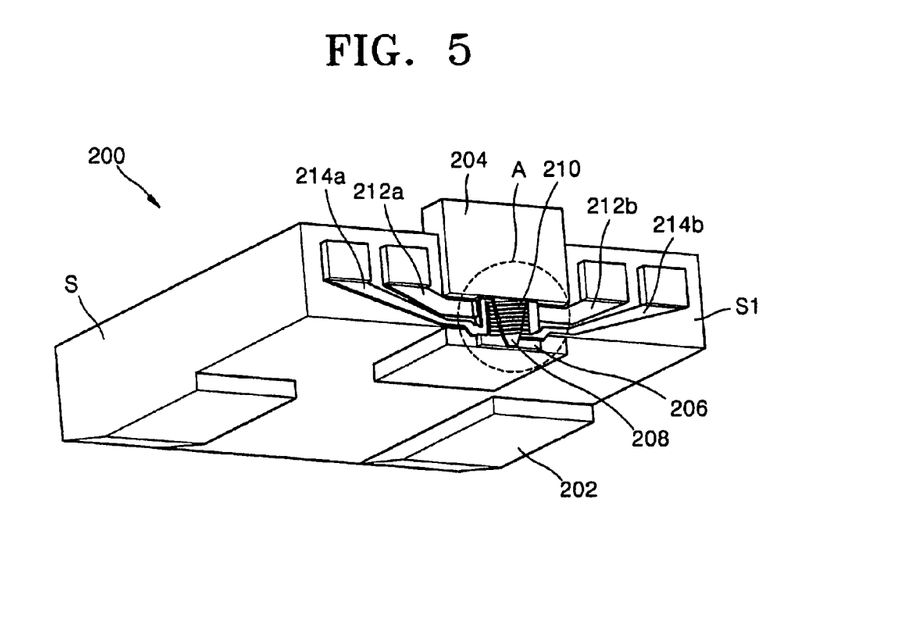
FIG. 5 is a perspective view of a hybrid head to record and reproduce high density data according to an embodiment of the present invention.

Referring to FIG. 5, reference numeral 200 represents a hybrid head to record and reproduce data (hereinafter, referred to as head). The head 200 includes a slider S and an element A to record and to reproduce data, which is formed on the back of slide S. An air bearing surface (ABS) 202 is formed at the bottom of the slider S which is supposed to face a recording medium in the case of recording and reproducing data.

The element A to record and reproduce data includes an energy source 204 to supply energy, which is used to heat a particular region of the recording medium until the temperature of the heated region rises to about Curie's temperature, or preferably, above Curie's temperature. The energy source 204 is formed in the slider S at a certain depth. In addition, it is formed to protrude from the back side S1 of the slider S at a certain height. The energy source 204 may be a light source. However, the energy source 204 may be a heat source or other energy sources. The energy source 204 may be a laser beam emitter, for example, a laser diode. A shield layer 206 is formed on the back side S1 of the slider S below the energy source 204 so that the end of the shield layer 206 can extend to the bottom side of the ABS 202 attached to the bottom side of the slider S. A first conductor 212a and a second conductor 212b are formed on the backside S1 of the slider S to extend from the shield layer 206. Magnetic field appliers 208 and 210 are installed on the shield layer 206 to apply a magnetic field to record data on the particular region of the recording medium. Third and fourth conductors 214a and 214b are formed on the backside S1 of the slider, which is not occupied by the shield layer 206, below the first and second conductors 212a and 212b.

Figure 6:
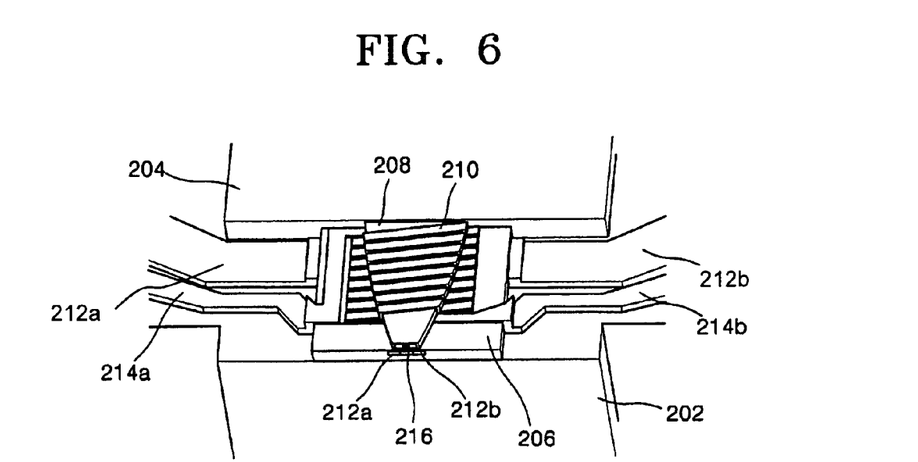
FIG. 6 is an enlarged perspective view of a recorder and a reproducer illustrated in FIG. 5.

Referring to FIG. 6, the third and fourth conductors 214a and 214b are connected to a coil 210 winding around a pole element 208 on the shield layer 206. In other words, one end of the coil 210 is connected to the third conductor 214a, and the other side of the coil 210 is connected to the fourth conductor 214b. One end of the coil 210 is located at the upper portion of the pole element 208, and the other end is located at the lower portion of the pole element 208. Since the coil 210 is formed winding around the pole element 208, part of the coil 210 is located between the shield layer 206 and the pole element 208. Accordingly, what is formed directly on the shield layer is not the pole element 208 but part of the coil 210. The pole element 208 is formed in parallel with the shield layer 206. The upper end of the pole element 208 is attached to the bottom side of the energy source 204, and the lower end of the pole element 208 is formed extending to the lower end of the shield layer 206. The pole element 208 is formed like a reversed trapezoid, and the width and area gradually increase from the bottom to the top. Accordingly, the width and size of the upper part of the pole element 208 are much greater than the width and size of the lower part of the pole element 208. The other elements are formed at the bottom center of the pole element 208 opposite to a recording medium, such as a hard disc, which will be described in more detail later. Parts of the first and second conductors 212a and 212b are exposed at the center of the bottom of the shield layer 206 corresponding to the center of the pole element 208. A magnetic sensor 216 is exposed at the bottom of the shield layer 206 between the parts of the first and second conductors 212a and 212b. The magnetic sensor 216 is preferably a grand magneto resistive sensor, the magnetic resistance of which varies according to the magnetization direction of data, i.e., bits recorded on a recording medium. However, the magnetic sensor 206 may also be a tunnel magneto resistive (TMR) sensor or a spin value sensor. In a case where the magnetic sensor 216 is a GMR sensor, the magnetic sensor 216 is preferably formed of a multi-layered film comprising a magnetic material and a nonmagnetic material.

Figure 7:
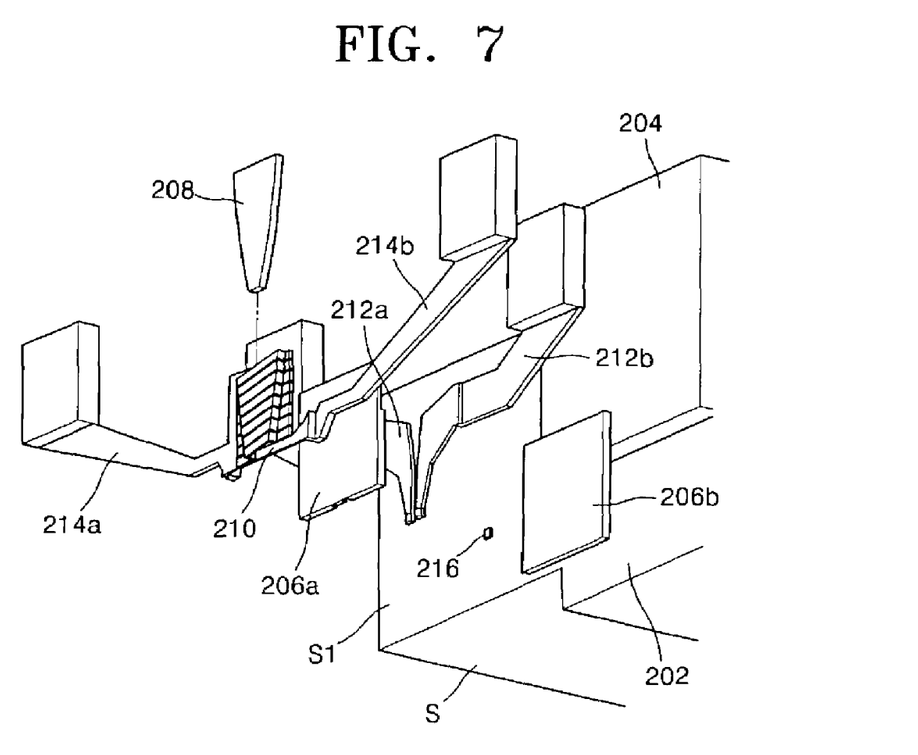
FIG. 7 is an exploded perspective view of a head illustrated in FIG. 5.

Referring to FIG. 7, the shield layer 206 includes a first shield layer 206a, which partly contacts the coil 210, and a second shield layer 206b, which contacts the backside Si of the slider S. Since the first and second shield layers 206a and 206b are introduced to prevent reproduced data from being magnetically affected by other adjacent data, it is an aspect of the invention to form the first and second shield layers 206a and 206b of a nonmagnetic material which is conductive. The first and second conductors 212a and 212b are formed in symmetry. The first conductor 212a is formed by extending from a certain region corresponding to the lower part of the shield layer 206 toward the upper right side of the shield layer 206. On the other hand, the second conductor 212b is formed by extending from a certain region slightly away from the starting point of the first conductor 212a toward the upper left side of the shield layer 206. Current to reproduce data is provided through the first and second conductors 212a and 212b. The magnetic sensor 216 is formed between the first and second conductors 212a and 212b on the shield layer 206 so that it can contact the first and second conductors 212a and 212b. Accordingly, parts of the first and second conductors 212a and 212b inside the shield layer 206 are separated.

Referring to FIG. 7, the third and fourth conductors 214a and 214b have almost the same structure as the first and second conductors 212a and 212b except for their positions and the fact that they are connected to each other by a coil 210. In addition, it is possible to figure out how the coil 210 is connected to the pole element 208 by referring to FIG. 7.

Figure 8:
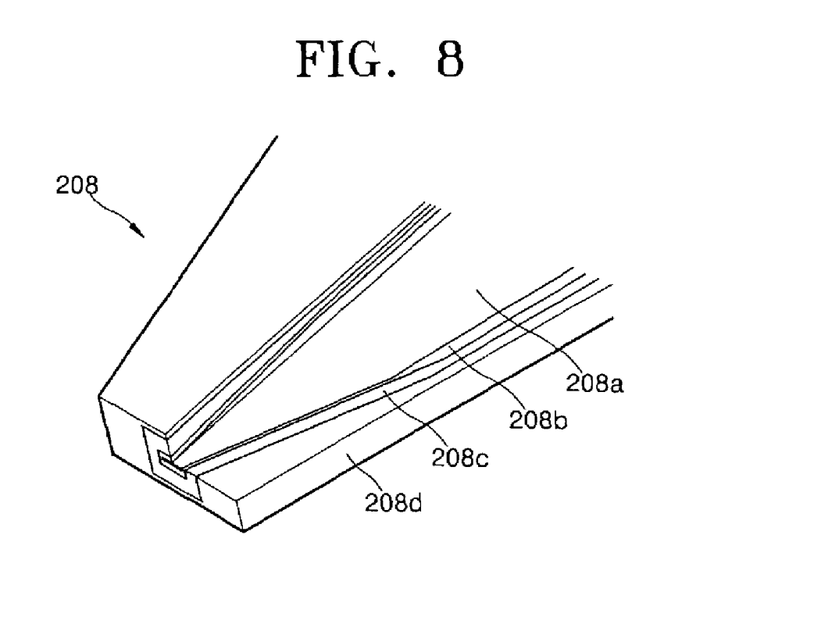
FIG. 8 is an enlarged perspective view of a pole including a heat absorption layer formed around a heat transmission channel.

Referring to FIG. 8, energy transmission elements 208a and 208b are formed at the center of the pole element 208 to transmit energy supplied from the energy source 204. The energy transmission elements 208a and 208b constitute a channel to transmit energy. The energy transmission elements 208a and 208b are waveguides for transmitting energy, for example, heat or light energy, emitted from the energy source 204 and comprise a waveguide layer 208a, through which the energy emitted from the energy source 204 travels, and a reflection layer 208b, which prevents the energy traveling through the waveguide layer 208a from being emitted to the outside. The waveguide layer 208a is formed so that the area of the waveguide layer 208 becomes gradually increased from the bottom to the top. The reflection layer 208b is formed to cover all the sides of the waveguide layer 208a between the region of the waveguide layer 208a to which energy is emitted from the energy source 204, and the region of the waveguide layer 208a from which the energy is emitted to a predetermined region of the recording medium to record data.

All of the energy transmitted through the waveguide layer 208a are electronic waves irrespective of the type. Since the transmission of energy through the waveguide layer 208a is enabled by taking advantage of the total reflection characteristics of electronic waves, the reflection layer 208b is preferably formed of a material layer having a higher refractive index than the waveguide layer 208a. The reflection layer 208b may be formed of multi-layers having different refractive indexes.

The energy transmission elements 208a and 208b may be formed in different shapes according to the energy source 204. For example, in a case where the energy source 204 is a light source, and more specifically, a laser emitter like a semiconductor laser diode, the energy transmission elements 208a and 208b may be replaced by optic fibers. In a case where the energy source 204 is a laser emitter like a laser diode, which has greater performance than a laser diode in some respects and has an energy emission region whose area is almost the same as or is smaller than the area of the energy emission region of the waveguide layer 208a, the spot size of laser beams emitted from the energy source 204 is maintained until the laser beams reach a predetermined region of the recording medium to be data-recorded through the waveguide layer 208a or is enlarged to the extent that it does not affect the density of data to be recorded. Thus, the waveguide layer 208a is preferably formed of a material layer having the same diameter from the top to the bottom. On the other hand, in a case where the spot size of laser beams emitted from the energy source 204 is smaller than the spot size of laser beams emitted from the lower end of the waveguide layer 208a, the waveguide layer 208a may be formed so that the cross section of waveguide layer 208 is gradually enlarged from the top to the bottom. Preferably, energy emitted from the energy source 204 is precisely received by the waveguide layer 208a so that total reflection conditions can be satisfied. Accordingly, it is preferable to precisely align the pole element 208 with the energy source 204 so that the waveguide layer 208a and the energy transmission region (not shown) of the energy source 204 can satisfy the total reflection conditions.

Referring to FIG. 8, the reflection layer 208b is sequentially covered by a heat shield member 208c and a write pole 208d which constitutes the outside of the pole element 208 and generates a magnetic field used to record data on the recording medium. The heat shield member 208c is formed so that it can cover the reflection layer 208b and contact the entire surface of the reflection layer 208.

Before recording data on a recording medium, a predetermined region of the recording medium to be data-recorded is heated to be around or above Curie's temperature so that the magnetic force of the predetermined region can be lowered. During the heating of the predetermined region to be data-recorded, heat may be emitted from the energy transmission element 208 to adjacent elements, for example, the write pole 208d and the magnetic sensor 216. Accordingly, the performance of the write pole 208d may be deteriorated in accordance with variations in the physical characteristics of the write pole 208d, such as permeability, and the magnetic sensor 216 may lose its magnetization functions. The heat shield member 208c prevents the heat generated by the energy transmission element 208 from being transmitted to the elements around the energy transmission element 208. Accordingly, the functions of the write pole 208d can be normally maintained during recording data, and thus it is possible to precisely record desired data on a desired portion of the recording medium. In addition, it is possible to prevent the magnetization functions of the magnetic sensor 216 from being deteriorated due to the heat generated by the heat transmission element 208. The heat shield member 208c is preferably a heat absorption layer, which absorbs the heat generated by the heat transmission element 208 but does not transmit the absorbed heat to other elements inside the pole element 208. Additionally, the heat shield member 208c may be a heat absorption layer which can minimize the amount of heat transmitted to other elements in the pole element 208 so that it does not affect the normal functions of other elements. Also, the heat shield member 208c may be an adiabatic layer. The write pole 208d, which applies a magnetic field corresponding to data desired to be recorded on the heated region of the recording medium, is preferably formed of a soft magnetic material. The write pole 208d is formed so that the thickness in the direction of the tracks of a disk is greater than the thickness in the direction perpendicular to the tracks of the disk.

Hereinafter, the operation of a hybrid head to record and reproduce data according to the present invention will be briefly described.

Data recorded on a recording medium is reproduced in a state where current is applied to the first and second conductors 212a and 212b. If the head gets close to the recording medium, for example, a magnetic optic disk, and follows the tracks, on which data is recorded, the magnetic resistance of the magnetic sensor 216, i.e., a GMR sensor, varies in accordance with the variation in the magnetization direction of data bits recorded on the tracks. As a result, the difference in voltages between both ends of the magnetic sensor 216 varies, and thus electric signals corresponding to the variation in the magnetization direction of the data bits are generated. The electric signals, then, are interpreted and processed in a type that a user can recognize. Next, the processed results are output to the outside, and the data recorded on the recording medium is reproduced.

An operation of recording data on the recording medium starts with heating a predetermined region of the recording medium to be data-recorded, i.e., a certain region of one selected track. The region of the track to be heated is determined by the spot size of laser beams transmitted via the waveguide layer 208a, preferably, by the spot size of the laser beams when the laser beams reach the predetermined region of the recording medium. During the transmission of the laser beams, heat generated from the waveguide layer 208a is absorbed or blocked by the heat shield member 208c. When the predetermined region of the recording medium is heated, current for data recording is applied to the coil 210 through the third and fourth conductors 214a and 214b. As a result, a magnetic field is generated at the lower end of the write pole 208d close to the predetermined region of the recording medium. The predetermined region of the recording medium heated is magnetized by the magnetic field, and then, data is recorded on the recording medium. Since the magnetic force of the heated region is lower than the magnetic force of other regions of the recording medium, it is possible to record data on the heated region with a weaker magnetic field than the magnetic field required to record data on other regions of the recording medium. For example, it is possible to record data on the heated region with a magnetic field of several Oersteds.

During the recording of data, the region where the magnetic field is applied is much larger than the heated region of the recording medium. However, the region, where data is recorded is restricted to the heated region. Accordingly, the density of data recorded on the recording medium depends on the size of the heated region. The size of the heated region depends on the spot size of energy beams reaching the recording medium via the waveguide layer 208a. Accordingly, the density of data recorded on the recording medium is determined by the spot size of the energy beams reaching the recording medium. Therefore, it is possible to record data with a track width of several nano meters by integrating the energy beams emitted from the energy emitter 204.

As described above, an energy transmission element, through which energy beams are used to heat a region to be data-recorded are transmitted, is surrounded by a heat shield element. Thus, it is possible to prevent elements around the energy transmission element, such as a write pole or a magnetic sensor for reproducing data, from being functionally deteriorated. Accordingly, the write pole and the magnetic sensor can function normally, thus increasing reliability related to recording and reproducing data. In addition, it is possible to increase the density of data recorded on a recording medium by integrating energy beams reaching the recording medium and thus minimizing the size of a region of the recording medium heated by the energy beams.

Although a few embodiments of the present invention have been shown and described, it would be appreciated by those skilled in the art that changes may be made in this embodiment without departing from the principles and spirit of the invention, the scope of which is defined in the claims and their equivalents. For example, an energy source may be isolated from a pole element, or an optic fibers may be formed between the pole element and the energy source to connect the waveguide layer of the pole element to the energy beam emission region of the energy source.

What is claimed is:

1. A hybrid head to record data on and reproduce data from a recording medium, the hybrid head comprising an element to record data on and reproduce data from the recording medium, the element being disposed on a back surface of a slider adjoining an air bearing surface of the slider, the element comprising:
    a data reproducer to reproduce data from the recording medium;
    an energy source to supply energy to heat a region of the recording medium on which data is to be recorded; and
    a magnetic field applier to apply a magnetic field to the region of the recording medium heated by the energy supplied by the energy source, the magnetic field applier comprising:
        a waveguide layer to transmit the energy supplied by the energy source to the region of the recording medium, the waveguide layer having a first surface facing toward the energy source and a second surface facing away from the energy source;
        a reflection layer to reflect the energy transmitted by the waveguide layer back into the waveguide layer, the reflection layer having a first surface aligned with the first surface of the waveguide layer and a second surface aligned with the second surface of the waveguide layer, the reflection layer completely enclosing the waveguide layer except for the first surface of the waveguide layer and the second surface of the waveguide layer;
        a heat shield member to prevent heat from being transmitted from the waveguide layer and the reflection layer to any other element of the hybrid head, the heat shield member having a first surface aligned with the first surface of the waveguide layer and a second surface aligned with the second surface of the waveguide layer, the heat shield member completely enclosing the reflection layer except for the first surface of the reflection layer and the second surface of the reflection layer;
        a single write pole having a first surface aligned with the first surface of the waveguide layer and a second surface aligned with the second surface of the waveguide layer, the single write pole completely enclosing the heat shield member except for the first surface of the heat shield member and the second surface of the heat shield member; and
    a magnetic field generator to generate a magnetic field and apply the magnetic field to the write pole.

2. The hybrid head of claim 1, wherein the energy source is a light source or a heat source.

3. The hybrid head of claim 2, wherein the energy source is the light source; and
    wherein the light source is a laser diode.

4. The hybrid head of claim 3, wherein the laser diode is partially embedded in the slider so that the laser diode protrudes from the slider in a direction extending away from the air bearing surface of the slider, and is spaced away from the air bearing surface of the slider.

5. The hybrid head of claim 1, wherein a cross-sectional area of the waveguide layer decreases from the first end of the waveguide layer to the second end of the waveguide layer.

6. The hybrid head of claim 1, wherein the reflection layer comprises a plurality of layers each having a higher refractive index than the waveguide layer.

7. The hybrid head of claim 1, wherein the waveguide layer and the reflection layer are part of an optic fiber.

8. The hybrid head of claim 1, wherein the heat shield member is a heat absorption layer or a heat shield layer.

9. The hybrid head of claim 1, wherein the write pole is made of a soft magnetic material.

10. The hybrid head of claim 1, wherein the magnetic field generator comprises:
    a coil winding around the write pole so that a portion of the coil contacts the data reproducer, the coil having two ends; and
    two conductors respectively connected to the two ends of the coil.

11. The hybrid head of claim 10, wherein the two conductors are substantially symmetrical with respect to the coil.

12. The hybrid head of claim 1, wherein the energy source protrudes from the back surface of the slider; and
    wherein the data reproducer comprises:
    a shield layer disposed on the back surface of the slider directly below the energy source, the shield layer having a first end facing toward the energy source and a second end facing away from the energy source;
    a first conductor and a second conductor that are substantially symmetrical with respect to the shield layer, the first conductor and the second conductor each extending from outside the shield layer through the shield layer to the second end of the shield layer, a portion of the first conductor and a portion of the second conductor being exposed at the second end of the shield layer; and
    a magnetic sensor disposed inside the shield layer between the portion of the first conductor and the portion of the second conductor that are exposed at the second end of the shield layer so that the magnetic sensor contacts the first conductor and the second conductor, the magnetic sensor being exposed at the second end of the shield layer.

13. The hybrid head of claim 12, wherein the shield layer comprises a first shield layer and a second shield layer;

wherein the magnetic sensor, a portion of the first conductor, and a portion of the second conductor are disposed between the first shield layer and the second shield layer; and wherein the second shield layer is disposed on the back surface of the slider.

14. The hybrid head of claim 12, wherein the first conductor and the second conductor extend from outside the shield layer into the shield layer near the first end of the shield layer, and then extend through the shield layer to the second end of the shield layer; and wherein the first conductor and the second conductor are symmetrical with respect to each other inside the shield layer.

15. The hybrid head of claim 12, wherein the magnetic sensor is a giant magneto resistive sensor, a tunnel magneto resistive sensor, or a spin valve sensor.

16. The hybrid head of claim 12, wherein the second surface of the waveguide layer and the second end of the shield layer are substantially aligned with the air bearing surface of the slider.

17. The hybrid head of claim 1, wherein the second surface of the waveguide layer is substantially aligned with the air bearing surface of the slider.

18. A hybrid head comprising:
a slider having an air bearing surface and a back surface adjoining the air bearing surface;
an energy source to supply energy;
a shield layer formed on the back surface of the slider, the shield layer having a first end facing the energy source and a second end facing away from the energy source;
a first conductor and a second conductor each having a portion disposed on the back surface of the slider extending away from the shield layer and a portion extending inside the shield layer;
a magnetic sensor disposed in the shield layer between and in contact with the portion of the first conductor and the portion of the second conductor that extend inside the shield layer, the magnetic sensor being exposed at the second end of the shield layer;
a third conductor and a fourth conductor disposed on the back of the slider adjacent to the first conductor and the second conductor, respectively;
a pole element to record data on and/or reproduce data from a recording medium, the pole element having a first surface facing the energy source and a second surface facing away from the energy source; and
a coil winding around the pole element, the coil having a first end connected to the third conductor and a second end connected to the fourth conductor;
wherein the pole element comprises:
a waveguide layer to transmit the energy supplied by the energy source to the recording medium, the waveguide layer having a first surface aligned with the first surface of the pole element and a second surface aligned with the second surface of the pole element source;
a reflection layer to reflect the energy transmitted by the waveguide layer back into the waveguide layer, the reflection layer having a first surface aligned with the first surface of the pole element and a second surface aligned with the second surface of the pole element, the reflection layer completely enclosing the waveguide layer except for the first surface of the waveguide layer and the second surface of the waveguide layer;
a heat shield member having a first surface aligned with the first surface of the pole element and a second surface aligned with the second surface of the pole element, the heat shield member completely enclosing the reflection layer except for the first surface of the reflection layer and the second surface of the reflection layer; and
a single write pole having a first surface aligned with the first surface of the pole element and a second surface aligned with the second surface of the pole element, the single write pole completely enclosing the heat shield member except for the first surface of the heat shield member and the second surface of the heat shield member.

19. The hybrid head of claim 18, wherein the first end of the coil is disposed on a first side of the pole element and the second end of the coil is disposed on a second side of the pole element opposite to the first side of the pole element.

20. The hybrid head of claim 18, wherein the coil contacts the shield layer so that a portion of the coil is disposed between the shield layer and the pole element.

21. The hybrid head of claim 18, wherein the pole element is parallel to the shield layer.

22. The hybrid head of claim 18, wherein the first surface of the pole element contacts a surface of the energy source and the second surface of the pole element is substantially aligned with the second end of the shield layer.

23. The hybrid head of claim 22, wherein the second surface of the pole element and the second end of the shield layer are substantially aligned with the air bearing surface of the slider.

24. The hybrid head of claim 18, wherein the pole element has a reverse trapezoid shape so that a cross-sectional area of the pole element decreases from the first surface of the pole element to the second surface of the pole element.

25. The hybrid head of claim 18, wherein the magnetic sensor is a giant magneto sensor, a tunnel magneto resistive sensor, or a spin valve sensor.

26. The hybrid head of claim 18, wherein the shield layer comprises:
a first shield layer contacting the coil; and
a second shield layer disposed on the back of the slider;
wherein the magnetic sensor, the portion of the first conductor extending into the shield layer, and the portion of the second conductor extending into the shield layer are disposed between the first shield layer and the second shield layer.

27. The hybrid head of claim 26, wherein the first shield layer and the second shield layer are made of a non-magnetic conductive material.

28. The hybrid head of claim 18, wherein the portion of the first conductor extending inside the shield layer extends from an area adjoining a first side of the shield layer near the first end of the shield layer to a first area adjoining the second end of the shield layer;
wherein the portion of the second conductor extending inside the shield layer extends from an area adjoining a second side of the shield layer near the first end of the shield layer to a second area adjoining the second end of the shield layer; and
wherein the first side of the shield layer and the second side of the shield layer are opposite sides of the shield layer.

29. The hybrid head of claim 18, wherein the waveguide layer and the reflection layer are part of an optic fiber.

30. The hybrid head of claim 18, wherein the waveguide layer has a cross-sectional area that gradually decreases from the first surface of the waveguide layer to the second surface of the waveguide layer.

31. The hybrid head of claim 18, wherein the reflection layer has a higher refractive index than the waveguide layer.

32. The hybrid head of claim 18, wherein the reflection layer comprises a plurality of layers having different refractive indexes.

33. The hybrid head of claim 18, wherein the heat shield member is a heat absorption layer to minimize an amount of heat transmitted to other elements of the hybrid head so that the heat does not affect normal functions of the other elements.

34. The hybrid head of claim 18, wherein the heat shield member is an adiabatic layer.

35. The hybrid head of claim 18, wherein the recording medium is a disk having tracks; and wherein the write pole is made of a soft magnetic material and has a thickness in a direction of the tracks of the disk that is greater than a thickness of the write in a direction perpendicular to the tracks of the disk.

36. The hybrid head of clam 18, wherein the heat shield member is a heat absorption layer that absorbs heat generated by the waveguide layer and the reflection layer to prevent the heat from being transmitted to any other element of the hybrid head.

37. The hybrid head of claim 18, wherein the second surface of the pole element and the second end of the shield layer are substantially aligned with the air bearing surface of the slider.

* * * * *

UNITED STATES PATENT AND TRADEMARK OFFICE
CERTIFICATE OF CORRECTION

PATENT NO.       : 7,327,639 B2  
APPLICATION NO.  : 10/401583  
DATED            : February 5, 2008  
INVENTOR(S)      : Dong-seob Jang et al.

Page 1 of 1

It is certified that error appears in the above-identified patent and that said Letters Patent is hereby corrected as shown below:

Title Page, Item (75) Inventors, change "Kun-ho Chu" to --Kun-ho Cho--.

Column 14, line 5, change "clam" to --claim--.

Signed and Sealed this

Twenty-seventh Day of May, 2008

JON W. DUDAS  
*Director of the United States Patent and Trademark Office*